United States Patent
Furukawa et al.

[11] Patent Number: 5,841,091
[45] Date of Patent: Nov. 24, 1998

[54] ELECTRICAL DISCHARGE MACHINING DEVICE AND ELECTRICAL DISCHARGE MACHINING METHOD

[75] Inventors: Toshihiko Furukawa; Tatsuo Kuroda, both of Yokohama, Japan

[73] Assignee: Sodick Co., Ltd., Japan

[21] Appl. No.: 809,417

[22] PCT Filed: Sep. 20, 1996

[86] PCT No.: PCT/JP96/02735

§ 371 Date: Apr. 25, 1997

§ 102(e) Date: Apr. 25, 1997

[87] PCT Pub. No.: WO97/10918

PCT Pub. Date: Mar. 27, 1997

[30] Foreign Application Priority Data

Sep. 22, 1995 [JP] Japan ................................. 7-269343

[51] Int. Cl.⁶ .............................. B23H 1/00; B23H 7/02
[52] U.S. Cl. ............................................................ 219/69.12
[58] Field of Search ............................. 219/69.12, 69.17

[56] References Cited

U.S. PATENT DOCUMENTS

| | | | |
|---|---|---|---|
| 4,263,116 | 4/1981 | Inoue | 219/69.12 |
| 4,371,432 | 2/1983 | Kyuchukov | 219/69.12 |
| 4,584,451 | 4/1986 | Inoue | 219/69.12 |

FOREIGN PATENT DOCUMENTS

| | | | |
|---|---|---|---|
| 55-107926 | 7/1980 | Japan . | |
| 59-15776 | 4/1984 | Japan . | |
| 60-29029 | 2/1985 | Japan . | |
| 60-34219 | 2/1985 | Japan | 219/69.12 |
| 61-293721 | 12/1986 | Japan | 219/69.12 |
| 62-157727 | 7/1987 | Japan | 219/69.12 |
| 3-166022 | 7/1991 | Japan | 219/69.12 |
| 3-234419 | 10/1991 | Japan | 219/69.12 |
| 5-277838 | 10/1993 | Japan . | |

*Primary Examiner*—Geoffrey S. Evans

[57] ABSTRACT

An electrical discharges machining device which machines a workpiece by electrical discharge and imparts to the workpiece a curved profile and a straight profile connected to the curved profile, and which includes a wire electrode and a wire forming device, and which forms a concave channel in the wire electrode in the axial direction of that wire electrode. A conductive wire guide is provided having a curved edge and a straight edge connected to the curved edge. The wire electrode is fit onto the curved edge and the straight edge, and caused to travel along the wire guide edge. The wire guide is connected to the power supply, and also functions as a feeder to feed power to the traveling wire electrode. Preferably, the wire guide and wire guide forming device are arrayed so that the wire guide travels in a straight line between the intersection of the curved edge with the straight edge and the wire forming device.

7 Claims, 7 Drawing Sheets

ELECTRICAL DISCHARGE MACHINING DEVICE AND ELECTRICAL DISCHARGE MACHINING METHOD

FIELD OF THE INVENTION

The present invention relates to an electrical discharge machining device which machines a workpiece by electrical discharges, and imparts a profile to the workpiece which includes straight line segments and curved line segments, e.g. connecting to those straight lines. In particular, the present invention relates to an electrical discharge machining device for contouring a generally rod-shaped workpiece into a fine punch having a blade portion which forms a cutting blade edge, a shank portion which is greater in cross sectional area than the blade portion, and concave fillet portion which connects the blade portion and the shank portion.

BACKGROUND OF THE INVENTION

FIG. 8A illustrates a standard round punch 1, which may be used as a portion of a press die. The punch 1 includes a blade portion 1a, which forms a cutting edge, a shank portion 1c, which is larger in diameter than blade portion 1a, and a concave fillet portion 1b which connects the blade portion 1a and the shank portion 1c. FIG. 8B illustrates a punch 2, which includes a square-shaped blade portion 2a, a shank 2c, and a fillet portion 2b which connects the blade portion 2a and the shank 2c. These punches are fabricated by profile grinding or non-contacting electrical discharge machining. Electrical discharge machining is appropriate for the precision forming of a hard workpiece into the punch 1, having the small diameter blade portion 1a, or into the punch 2, having the thin blade portion 2a.

In order to fabricate a small diameter rod, Japan Patent Publication 4-28486 discloses an electrical discharge machine which generates electrical discharges between a rotatable workpiece and a wire electrode moving within a plane perpendicular to the rotating axis of the workpiece along the circumference of a pulley.

Japan Patent Publication 6-143040 discloses an electrical discharge machine which, using a traveling wire electrode, simultaneously makes a punch fillet portion and blade portion. Referring to FIG. 7, we shall now explain the electrical discharge machining apparatus disclosed in this document.

A workpiece 3 is held vertically in a chuck 13, which is attached to a head 12. The head 12 can move within a horizontal X-Y plane, and can also move in the Z-axis direction which is perpendicular to that plane. A wire 4 is unwound from a supply bobbin 20, and is fed upward by means of a guide roller 21. When the wire 4 reaches the bobbin 26, the bobbin 26 pulls the wire 4 as it passes by guides 22, 23 and 24, and a guide roller 25. The guides 22, 23, and 24 and the guide rollers 21 and 25 are positioned on a plate part 11, which is attached to a turntable 10. Each of the guides 22 and 24 has a V-shaped groove which guides the wire 4. A flat edge surface having a profile which is complementary to the convex shape of the punch fillet to be made is formed in the guide 23. The wire 4 travels along this edge, which is smaller in width than the diameter of the wire 4. The guide 23 is fabricated from an insulating material with a high wear-resistance, such as a ceramic or sapphire. The wire 4, which travels between guides 22 and 23, essentially conforms to the rotating axis of a turntable 10. Conductive feeders 27 and 28, which supply current to the wire 4, are respectively arrayed between the guide roller 21 and the guide 22 and between guide 24 and the guide roller 25.

In conventional electrical discharge machines of this type, there is a gradual removal of only a thickness of the workpiece surface which is smaller than the wire electrode diameter, so material removal speed is slow.

An object of the present invention is to provide an electrical discharge machining device to fabricate products having a profile which includes straight portions and arced portions connecting the straight portions, for example punches which are a part of a press dies, at a high material removal speed.

Other objects of the present invention will be noted in the explanation which follows, and will be apparent to practitioners of the art through implementation of the invention.

SUMMARY OF THE INVENTION

According to the present invention, an electrical discharge machining device is provided which imparts to a workpiece a curved profile and a straight profile connected to that curved profile. The device includes a wire electrode, a wire forming device which forms a convex channel in the axial direction of the wire electrode, a guide, a curved edge and a straight edge of which are capable of fitting into the convex channel of the wire electrode, a guide for causing the wire electrode to travel along the curved edge and the straight edge of the guide, and a power supply which supplies power to a machining gap formed between the workpiece and the wire electrode.

Preferably, the guide is electrically conductive, and power from the power supply is supplied to the wire electrode through the conductive guide.

Furthermore, the guide and the wire forming device are preferably arrayed so as to travel linearly between the intersection of the curved edge and the straight edge of the wire forming device.

Furthermore, one or more guides for preventing twisting of the wire electrode are preferably provided between the guide and the wire forming device.

According to the present invention, an electrical discharge machining method for machining a workpiece by electrical discharge and imparting to the workpiece a curved profile and a straight profile connected to the curved profile includes a step in which a concave channel is formed in a wire electrode in the axial direction thereof, a step in which a guide is provided, the guide being formed with a curved shape complementary to the curved profile and a straight edge which connects to the curved edge, a step in which the concave channel in the wire electrode is caused to fit the curved edge and straight edge, and the wire electrode is caused to travel along the guide edge, a step in which power is supplied to a machining gap formed between the workpiece and the wire electrode, and a step in which either the workpiece or the guide is caused to move, one relative to the other.

PREFERRED EMBODIMENT OF THE INVENTION

Figure 1:
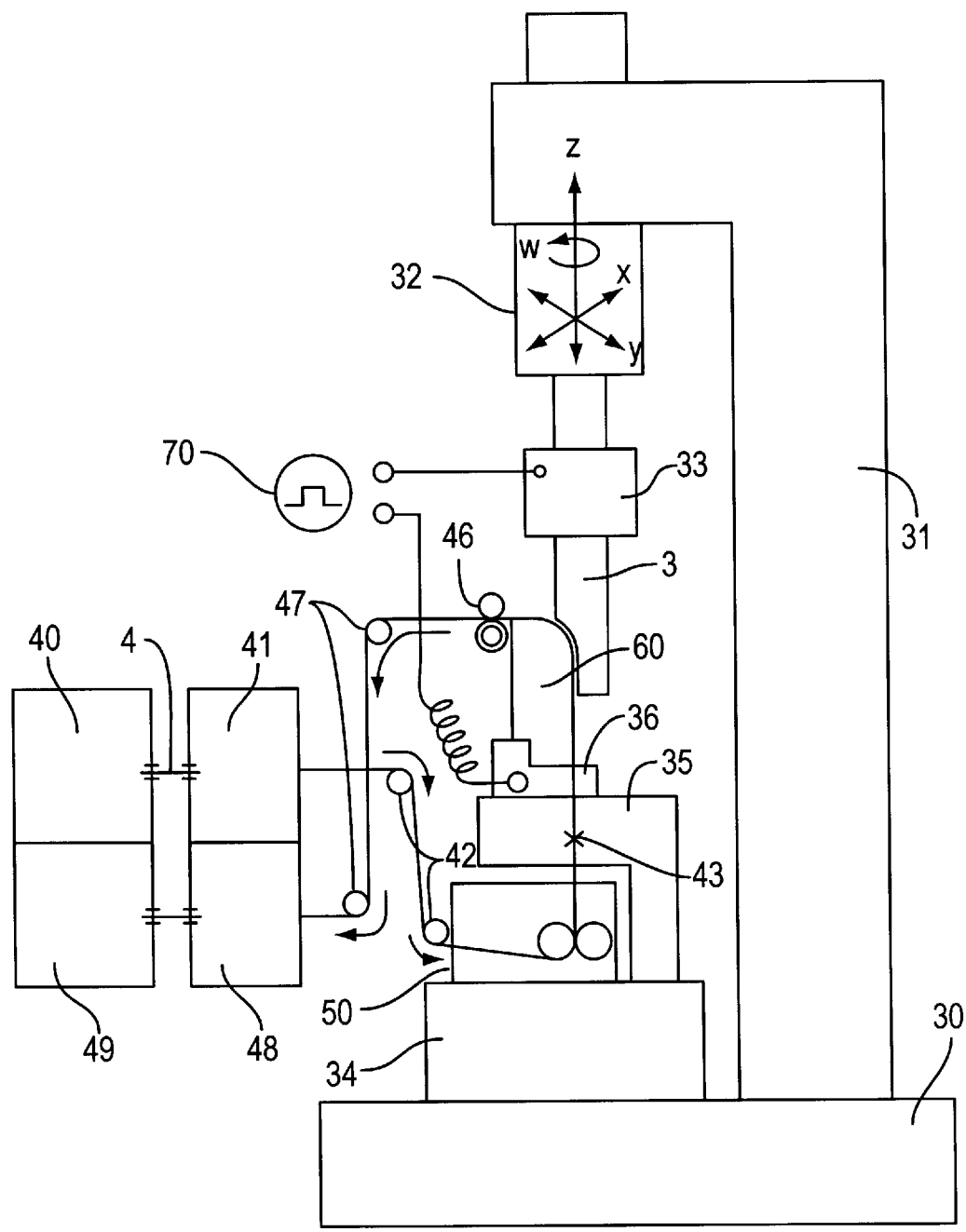
FIG. 1 is a schematic depiction of the electrical discharge machine of the present invention.

An electrical discharge machine according to the present invention as illustrated in FIG. 1 includes a base 30, a column 31 which stands on top of the base 30, and a head 32, which is rotatable around a vertical axis and attached to a column 31. A rod-shaped workpiece 3 is held vertically in a chuck 33, which is attached to head 32. The head 32 is able to move in a horizontal plane X-Y, and in the direction of the Z axis which is perpendicular to that plane and to rotate about an axis W, which is also perpendicular to that plane. A stand 35, which is attached to the table 34, is mounted on top of a base 30. A combination guide/electrode 60 is provided having an edge with a profile which is complementary to the concave form of the punch fillet to be formed. The guide/electrode 60 is attached to the stand 35 by means of an electrically conductive holder 36 so as to present in a direction perpendicular to the X-Y plane. In the illustrated embodiment, the workpiece 3 moves relative to guide 60 in the X-Y plane, but guide 60 may also be moved relative to workpiece 3 in the X-Y plane by the table 34.

Brass or copper wire 4, round in section and pulled from wire storage reel 40, is fed to wire forming device 50 through a pulley unit 41 and a guide roller 42. The pulley unit 41 imparts an appropriate braking force on the wire 4 in order to prevent slackness of the wire 4 between the pulley unit 41 and the wire forming device 50.

Figure 2A:
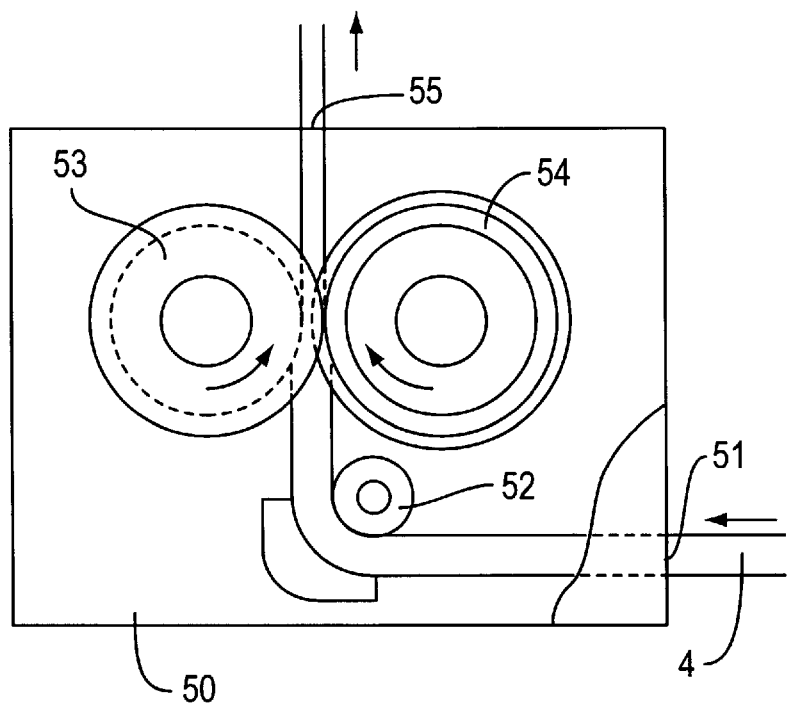
FIG. 2A is a schematic depiction of the wire forming device depicted in FIG. 1.
Figure 2B:
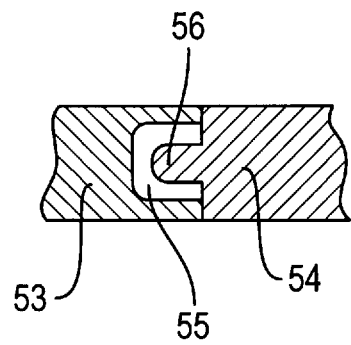
FIG. 2B is a sectional diagram of a pair of forming rollers as depicted in FIG. 2A.

The wire forming device 50, which is positioned on the table 34, forms a concave channel in the axial direction of the wire 4. As is shown in FIG. 2A, the wire forming device 50 may include a pair of forming rollers 53 and 54 which rotate synchronously with a speed control motor. The wire 4 is fed from an intake opening 51 through a guide roller 52, and passes between a roller pair 53 and 54. The roller pair 53 and 54 form a U-shape in the section of the wire 4 by cold rolling, while at the same time feeding the wire 4 upward toward an output hole 55. The wire travel speed is controlled by the rotation of the roller pair 53 and 54. As is best shown in FIG. 2B, a convex portion 56 is formed along the perimeter of the roller 54; while at the same time a U-shaped concave channel 55, which complements the convex portion 58, is formed.

Figure 3:
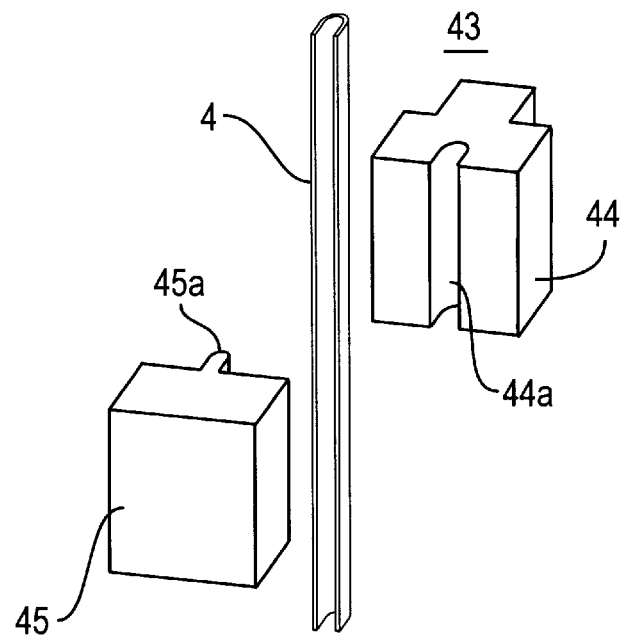
FIG. 3 is a perspective diagram of an intermediary guide as depicted in FIG. 1.

The wire 4, which has been fed from wire forming device 50, is transported to combination guide/electrode 60 via an intermediate guide 43, which is mounted on the stand 35. As illustrated in FIG. 3, the intermediate guide 43, which preferably comprises a pair of blocks 44 and 45, is provided in order to prevent twisting of the wire 4 between the wire forming device 50 and the guide 60. Indentation 44a, which has approximately the same form as concave channel 55 in roller 53, is formed on block 44, while at the same time protuberance 45a, having approximately the same shape as protuberance 56 in roller 54, is formed in block 45. The pair of blocks 44 and 45 are combined in such a way that a U-shaped gap is formed by indentation 44a and protuberance 45a through which the wire 4 can pass. Preferably, a material such as titanium nitride, which increases wear resistance and decreases sliding resistance, is coated onto the surfaces on which the wire 4 slides.

Figures 4A, 4B:
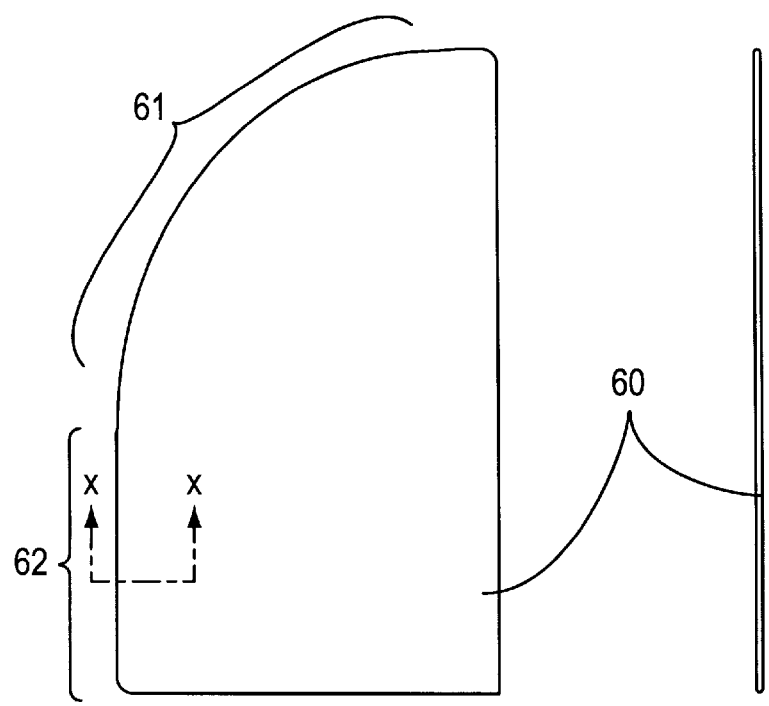
FIG. 4A is a side view of the guide depicted in FIG. 1.
FIG. 4B is a front view of the guide depicted in FIG. 1.
Figure 5A:
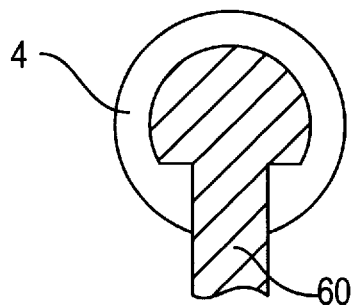
FIGS. 5A, 5B, 5C, 5D, and 5E are sections of the guide edge along section lines X—X in FIG. 4A.
Figure 5B:
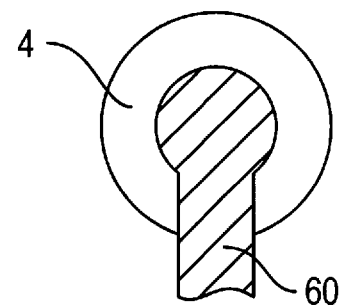
Figure 5C:
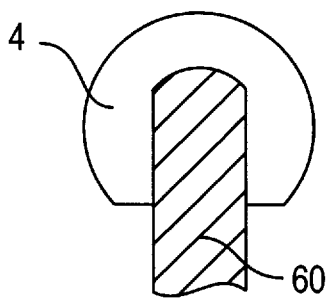
Figure 5D:
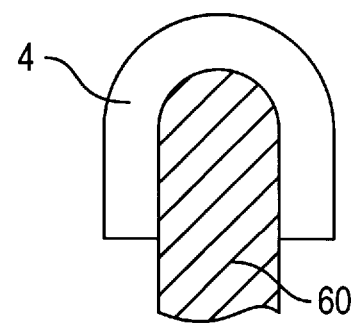
Figure 5E:
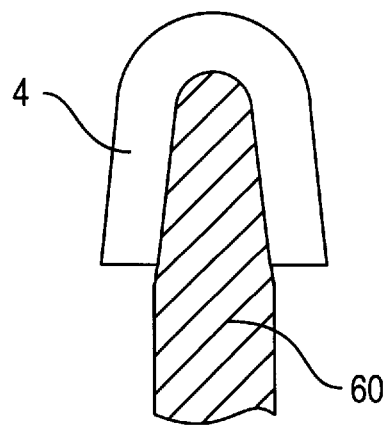

As shown in FIG. 4A, the guide 60 has an edge 61, with a profile complementary to the punch fillet to be formed, and an edge 62, which is connected to edge 61 and has a straight profile. The guide 60, intermediate guide 43, and the pair of forming rollers 53 and 54 are arrayed so as to travel linearly between the intersection of edges 61 and 62 and the roller pair 53 and 54. Preferably, the guide 60 is provided in proximity to the wire forming device 50, in order to prevent twisting and to reduce the sliding resistance of the wire 4 between the guide 60 and the wire forming device 50. As is best shown in FIG. 4B, the guide 60 is formed as a thin plate. For example, when a wire electrode having a diameter of 0.6 mm is used, the guide 60 may have a thickness of 0.3 mm. The guide 60 is preferably made of a sintered alloy or hardened steel material such as spring steel having good hardness and conductivity. Since the wire 4 is fed by rotation of the forming roller pair 53 and 54, it is not necessary to apply excessive pulling force to the wire 4, and distortion of guide 60 is thus prevented.

As is shown in FIGS. 5A, 5B, 5C, 5D and 5E, the edge of the combined guide/electrode 60 has a cross section which is complementary to the concave channel formed on the wire 4, so that the wire 4 will be reliably guided along the edge of the guide 60. At least the edge of the guide 60, which fits inside the concave channel in the wire 4, should be protected from wear caused by electrical discharge during machining.

Furthermore, the wire 4 is fed to a tension applying device 46, which applies an appropriate tension to the wire 4 so that the traveling wire 4 will be reliably guided along the edge of the guide 60. The tension imparting device 46 comprises, for example, a capstan and a pinch roller. Also, the wire 4, as it is fed to a wire recovery device 49 such as a take up roller or a bucket, may pass though multiple guide rollers 47 and a pulley unit 48.

Figure 7:
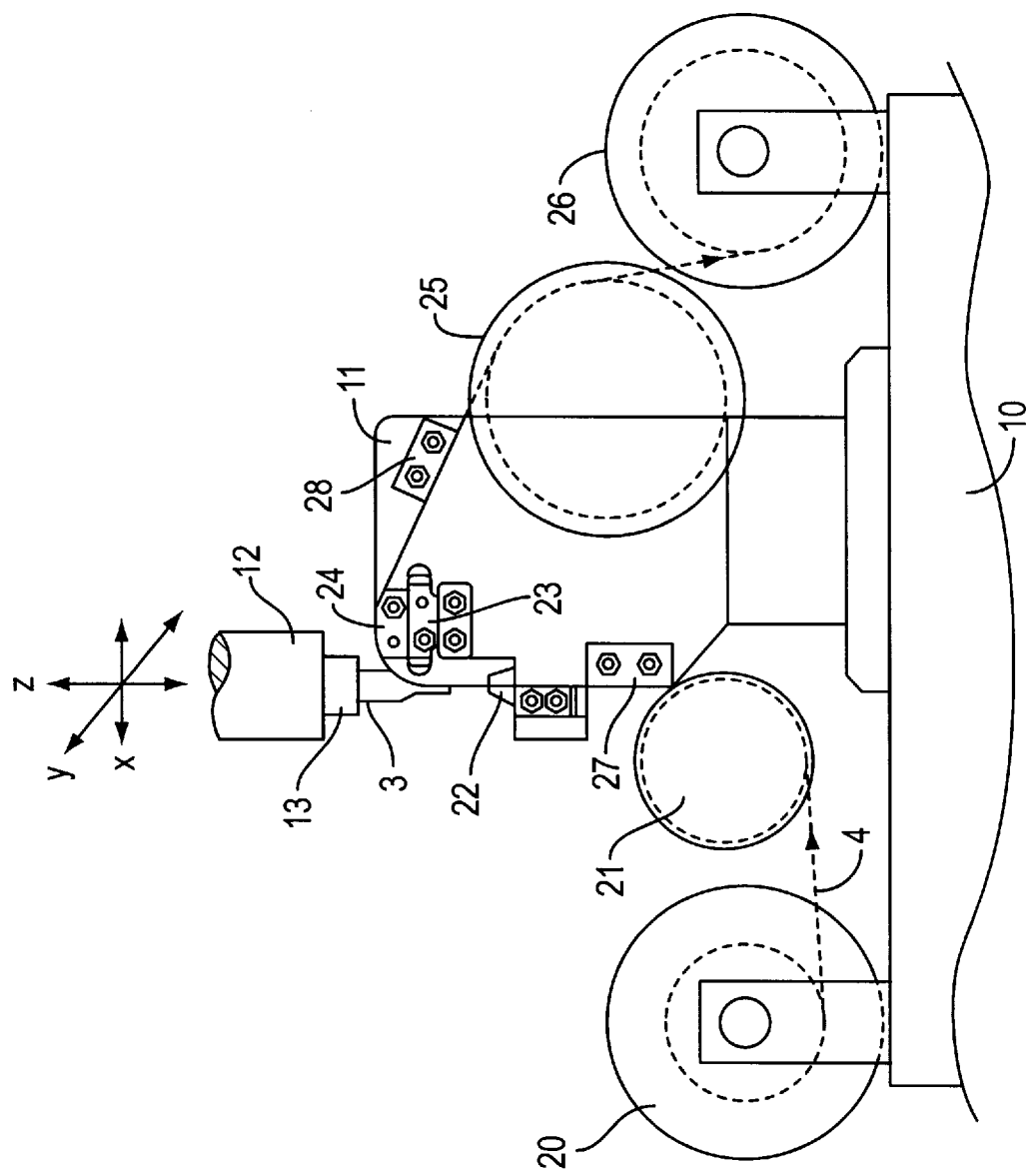
FIG. 7 is a summary diagram of a conventional electrical discharge machine.
Figure 8A:
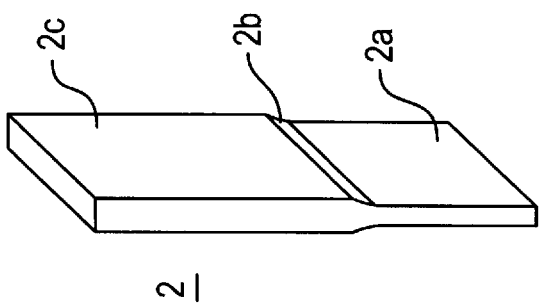
FIGS. 8A and 8B are schematic depictions of the punch to be formed.
Figure 8B:
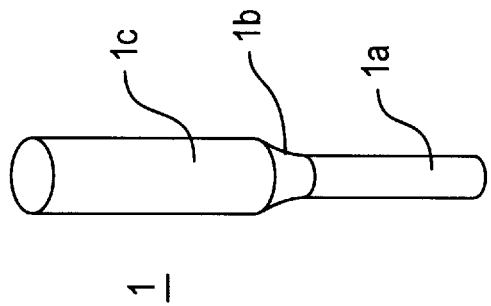

The electrical discharge machine includes, moreover, a power supply 70, one terminal of which is connected through the chuck 33 to the workpiece 3, and the other terminal of which is connected through mounting hardware 36 to the guide 60. During machining, a stream of power pulses from a power supply 70 is applied to the "machining gap," i.e., between the workpiece 3 and the guide 60 and between the workpiece 3 and the wire 4, while at the same time a dielectric fluid having a high resistance, such as water, is supplied to the machining gap in order to cool the electrode and the workpiece and to remove machining waste. In this manner, the guide 60, which has a large contact surface with the wire 4, functions as a feeder capable of feeding a large amount of power to the traveling wire 4. Machining power is supplied to the wire 4 in the immediate vicinity of the machining gap formed between the workpiece 3 and the wire 4, and therefore in comparison to a conventional electrical discharge machine such as shown in FIG. 7, its power losses are smaller. Either the workpiece 3 or the guide 60 is moved relative to the other within the X-Y plane, and a profile containing an arced portion and a straight portion is imparted to the workpiece 3.

Figure 6:
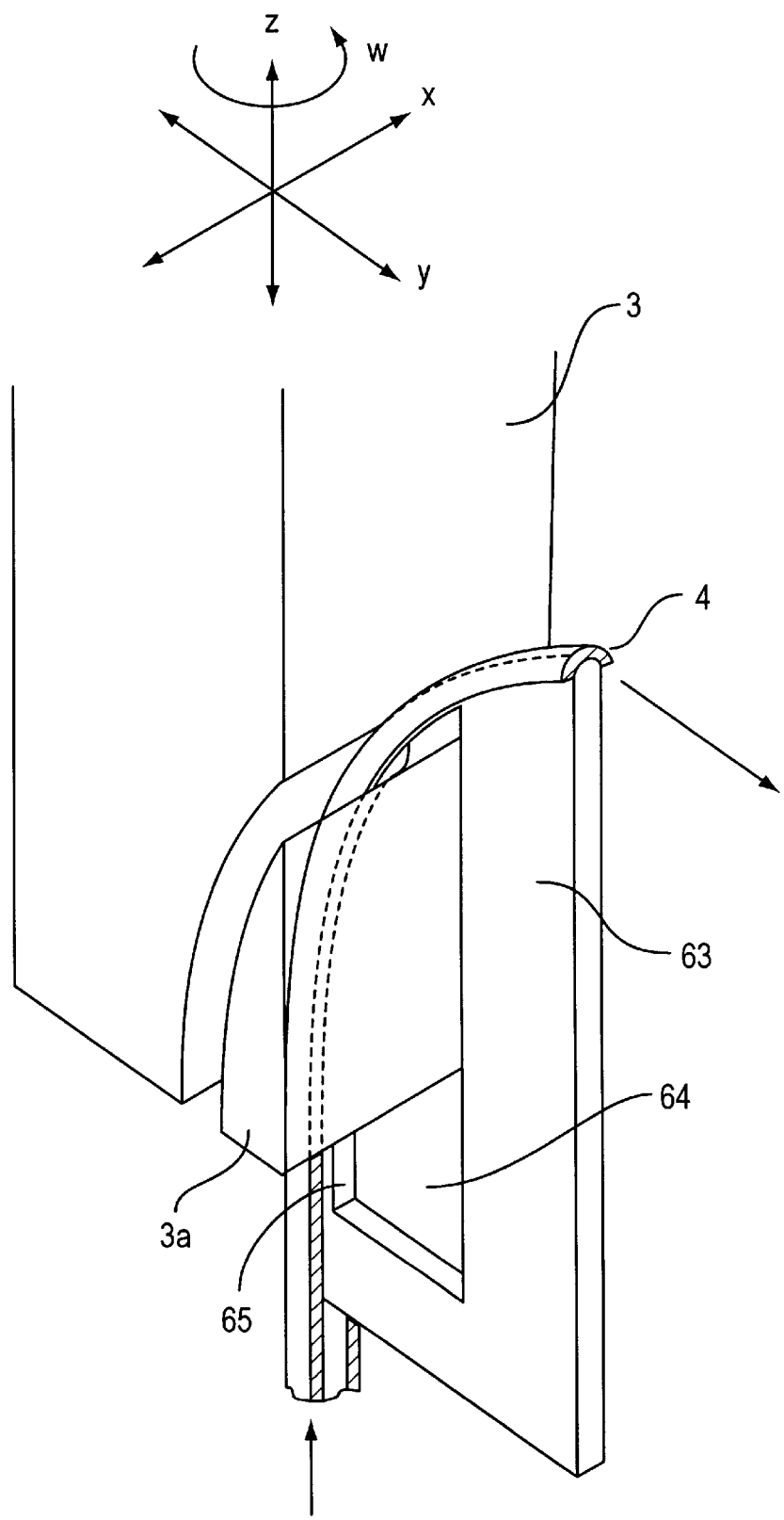
FIG. 6 is a perspective drawing which illustrates another embodiment of a guide according to the present invention.

The guide 60 is not necessarily limited to the embodiment shown in FIG. 4A. FIG. 6 illustrates another embodiment of a guide 63, which is formed with an opening 64 which is essentially similar in contour to the profile of the guide 63. Except for the opening 64, the guide 63 is identical to the guide 60. The long narrow edge 65 of the guide 63 will be acceptable if it can resist the tension on the wire 4 and the electrical discharge voltage at the machining gap, and maintains its profile. For example, when a wire 4 having a diameter of 0.6 mm is used, the edge of the guide 64 will preferably have a width of about 0.4–1.0 mm. While supplying power through the guide 63 to the wire 4 as it travels along the edge of the guide 64, and as the square columnar workpiece 3 is moved relative to the edge of the guide 64, a portion 3a is thus cut from the workpiece 3.

The present invention should not be limited to exact implementations or the forms disclosed. The fact that a number of improvements and variations are possible should be clear in light of the explanations above. The above embodiments were selected for the purpose of explaining the nature and practical application of the invention. The scope of the invention is to be defined by the appended claims.

We claim:

1. An electrical discharge machining apparatus for machining in a workpiece a curved profile and a straight profile connected to the curved profile, the electrical discharge machining apparatus comprises:

a wire electrode;

means for moving at least one of the workpiece and the wire electrode relative to the other within a plane;

means for rotating at least one of the workpiece and the wire electrode relative to the other about an axis perpendicular to the plane;

a wire forming device for forming a concave channel in the axial direction of the wire electrode;

an electrically conductive guide having a curved edge shaped complementary with respect to the curved profile and a straight edge connected to the curved edge, said curved edge and straight edge being sized to fit into said concave channel;

means for transporting the wire electrode along the straight edge and the curved edge of the guide; and a power supply for supplying power to a machining gap formed between the workpiece and the wire electrode.

2. The electrical discharge machine device according to claim 1, wherein power from the power supply is fed to the wire electrode through the guide.

3. The electrical discharge machine device according to claim 1, wherein the guide, the intermediate guide and the wire forming device are arrayed so that the wire electrode travels linearly between the wire forming device and the intersertion of the curved edge, and the straight edge.

4. The electrical discharge machine device according to claim 1, further comprises means for preventing twisting of the wire electrode mounted between the electrically conductive guide and the wire forming device.

5. The electrical discharge machine device according to claim 1, further comprising means for rotating the workpiece.

6. The electrical discharge machining apparatus according to claim 1, further comprises an intermediate guide for preventing twisting of the wire electrode, the intermediate guide being mounted between said wire forming device and said electrically conductive guide.

7. A method of electrical discharge machining while imparting in a workpiece a curved profile and a linear profile connected to the curved profile using a wire electrode, comprising:

forming a concave channel in the axial direction of the wire electrode;

providing a guide, having a curved edge which is complementary to the curved profile, and a straight edge connected to the curved profile;

fitting the concave channel of the wire electrode to the curved edge and the straight edge, and causing the wire electrode to travel along the guide edge;

providing power to the machining gap formed between the workpiece and the wire electrode, and; moving either the workpiece or the guide relative to the other.

* * * * *